Feb. 10, 1942. L. C. WEAVER ET AL 2,272,928
SHUTTER CONTROLLING DEVICE
Filed Nov. 15, 1937 2 Sheets-Sheet 2
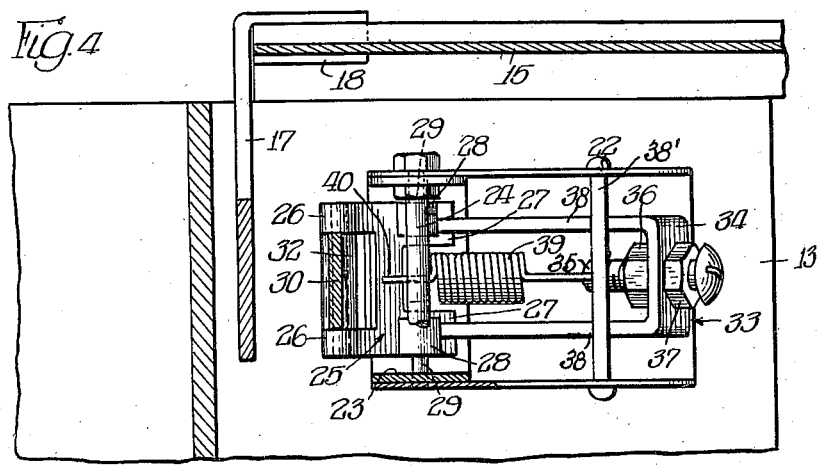
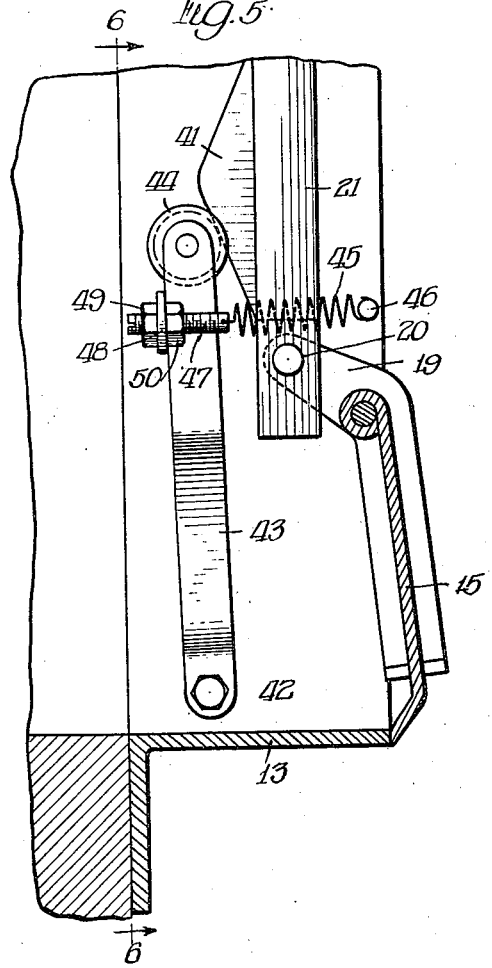
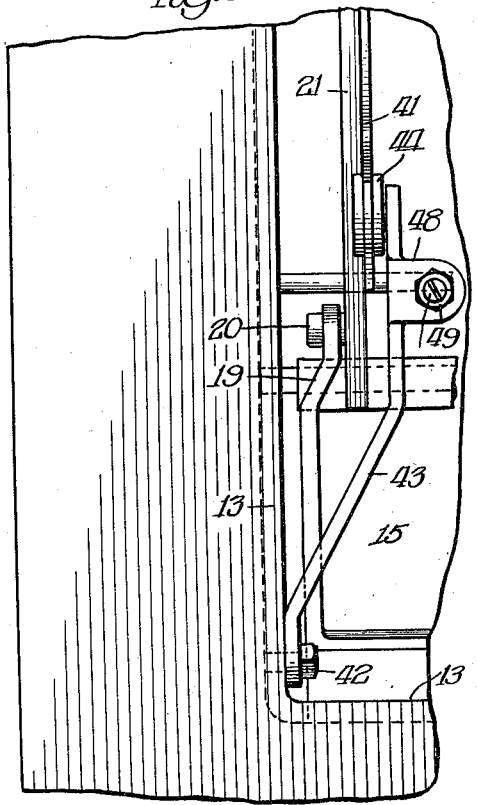
Inventors:
Lewis C. Weaver,
Arthur G. Sutcliffe,
By Fisher, Clapp, Soans & Pond
attys.

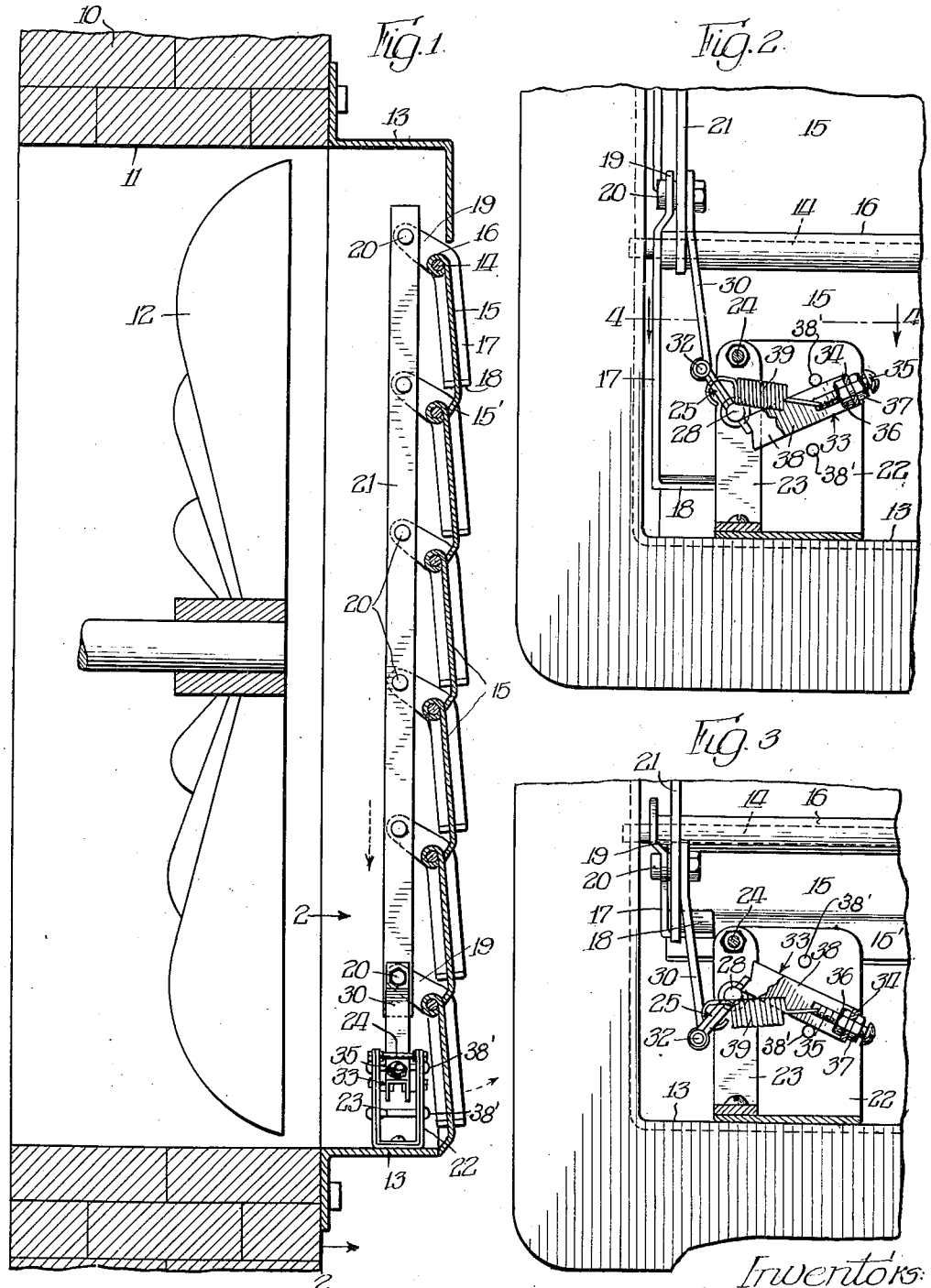

Patented Feb. 10, 1942

2,272,928

UNITED STATES PATENT OFFICE 2,272,928

SHUTTER CONTROLLING DEVICE

Lewis C. Weaver and Arthur G. Sutcliffe, Chicago, Ill., assignors to Ilg Electric Ventilating Company, Chicago, Ill., a corporation of Delaware Application November 15, 1937, Serial No. 174,575

9 Claims. (Cl. 98—116)

It has heretofore been known, in connection with ventilating fans mounted in or opposite to an opening in an external wall of a building, to provide a shutter or a gang of shutter blades on the outer side of the opening to close the latter against the ingress of rain, snow, or wind, when the fan is idle; the blade or blades closing by gravity and being opened by the blast of the fan. It has also been heretofore proposed to equip such a device with devices of various sorts to prevent or lessen the rattling of the blades and the consequent noise due to the effect of external wind and/or differential external and internal air pressures. Examples of such ventilating shutters are shown in Letters Patent to R. A. Ilg, No. 1,525,649, February 10, 1925, and to Sutcliffe, No. 1,917,340, July 11, 1933. In the aforesaid Ilg patent the shutter is automatically positively locked against opening or rattling when it is closed and the fan is idle, and the lock is released by means moved by the air blast when the fan starts in operation. In the aforesaid Sutcliffe patent the shutter is equipped with a pneumatic check, which permits it to open freely under the blast of the fan, but retards and dampens its closing movement.

The main object of the present invention is to provide an improved shutter control in the nature of an attachment, which shall have the double function of reducing the frictional resistance of the air flow through the shutter and thus lightening the motor load and assisting the blast when the fan is running to hold the shutter open, and holding the shutter closed to prevent rattling when the fan is idle.

Two practical embodiments of the principle of the invention are illustrated in the accompanying drawings, in which:

Fig. 1 is a vertical section through a ventilating opening in an external wall of a building, showing a ventilating fan, a shutter frame and a group of shutter blades mounted therein and connected for simultaneous operation, and having one form or embodiment of our present invention applied thereto.

Fig. 2 is a fragmentary enlarged inner or rear elevation of a lower corner portion of the shutter frame and shutter, also showing our improved shutter control applied thereto; the parts of the control appearing in the positions which they occupy when the shutter is closed.

Fig. 3 is a view similar to Fig. 2, but showing the positions assumed by the parts of the control when the shutter is open.

Fig. 4 is a further enlarged horizontal section taken on the line 4—4 of Fig. 2.

Figs. 5 and 6 illustrate another embodiment of the broad principle of the invention, Fig. 5 being a side elevation in vertical section through the lowermost shutter blade and the stationary shutter frame; and Fig. 6 being a rear elevation as viewed on line 6—6 of Fig. 5.

Referring to the drawings, and first briefly describing the known parts substantially as disclosed in the patents above identified, 10 may designate the external wall of a building in which is formed a ventilating opening 11. Within said opening is mounted a ventilating fan 12 of a well known type that, in practice, is usually driven by an electric motor (not shown).

Secured to the outer side of the wall 10 and surrounding the ventilating opening 11 is a rectangular metal shutter frame 13, in and between the vertical sides of which are journaled a series of horizontal shutter spindles 14, herein shown as disposed in a vertical plane.

15 designates the shutter blades or vanes each of which comprises a rectangular strip of sheet metal that is curled at its upper longitudinal edge around the spindle 14 as shown at 16. The lower, free longitudinal edge of each blade 15 is bent inwardly slightly, as shown at 15', and said inwardly bent edge overlaps the rounded upper edge of the next lowermost vane, as clearly shown in Fig. 1.

To secure simultaneous and equal opening and closing movements of the several blades, the latter are connected together by a mechanism which comprises a series of metal strips that are mounted on the respective spindles 14, each of said strips comprising a downwardly and forwardly projecting arm 17 having an inturned forked end 18 that embraces one end edge of the blade 15, and an upwardly and rearwardly extending arm 19. The outer ends of the arms 19 are pivotally united as by screws or bolts 20, or any other suitable pivot joints, to a connecting link 21.

Describing now the form of the improvement shown in Figs. 1 to 4 inclusive, mounted on the lower horizontal limb of the frame 13 is an upright U-shaped toggle casing or housing 22, in the outer end of which is mounted a similarly shaped yoke 23. In and across the upper ends of the members 22 and 23 is a tie bolt 24. 25 designates as an entirety one arm of the toggle which consists of an H-shaped plate formed with a pair of outwardly extending arms 26 and a pair of inwardly extending arms 27. The arms 27 are formed with bearings 28 that receive pivot pins 29 by which the toggle arm 25 is pivotally supported between the arms of the yoke 23. A link extension 30 pivoted to the main link 21 by a bolt 20 (which may be the same bolt that pivotally connects the arm 19 of the lowermost shutter blade to the link 21) extends downwardly between the arms 26 to the toggle arm 25, as shown in Fig. 4, and at its lower end is curled around a rod 32 extending between the arms 26. The other arm of the toggle designated as an entirety by 33 is a floating U-shaped member, in the transverse limb 34 of which is mounted a screw 35 locked in adjusted position by nuts 36 and 37. As shown in Figs. 2 and 3, the inner ends of the longitudinal limbs 38 of the toggle arm 33 abut against the inner ends of the arms 27 of the outer toggle arm to form the knuckle of the toggle; and to prevent accidental separation of the parts of the knuckle, the inner ends of the limbs 38 are concaved, preferably by giving them a shallow V form, as shown in Figs. 2 and 3. A closely coiled pull spring 39 is anchored at 40 to the toggle arm 25 and its other end is anchored to the inner end of the screw 35. The screw 35 thus serves as a means for adjusting the tension of the spring 39. Above and below the toggle arm 33 are transverse stop pins 38' mounted in and between the side walls of the housing 22, which limit the tilting movements of the arm 33 and prevent its disengagement from the cooperating arm 25 under the pull of spring 39.

It will thus be seen that the described toggle is one form of what is commonly known as an "over-the-center" toggle. As soon as the blast of the fan has raised the shutter blades to the point where the spring 39 has crossed the pivot axis of the toggle, the toggle arms are snapped from the position shown in Fig. 2 to that shown in Fig. 3, so that the toggle assists the fan blast to hold the shutter open. The gravity of the shutter blades, however, is greater than the tension of the spring 39 plus the weight of the links 21 and 30, so that, when the fan stops, the toggle snaps back from the position shown in Fig. 3 to the position shown in Fig. 2, in which latter position it acts to hold the shutters closed with sufficient force to prevent rattling from external winds. This closing urge, however, is less than the force of the fan blast on the shutter blades plus the weight of the links 21 and 30, so that the shutters readily open when the fan is started up.

A somewhat different form of the invention is illustrated in Figs. 5 and 6, this form, however, embodying the same broad operative principle as that previously described.

Referring to Figs. 5 and 6, on the lower end portion of the main link 21 is formed a cam 41 of a shallow inverted V-shape disposed lengthwise of the link 21, said cam being preferably located above the pivot 20 of the operating arm 19 of the lowermost shutter blade 15. Pivoted at 42 to a side wall of the frame 13 is an upstanding arm 43 carrying at its upper end a cam follower or roller 44 that coacts with the cam 41, and is caused to hug the cam under the pull of a spring 45 anchored at one end to a pin 46 in the frame 13 and at its other end to a screw 47 mounted in a lateral lug 48 on the arm 43 and locked in adjusted position by nuts 49 and 50. It will readily be seen that when the follower 44 is engaged with the lower incline of the cam 41 it acts to yieldably hold the shutters 15 closed. But when the follower 44 passes the peak of the cam 41 and rides onto the upper incline, as the shutters are being opened by the blast of the fan, the action of the spring 45 is then to assist the fan blast to hold the shutters open.

Both forms of the invention above presented thus automatically act in the same way on the shutter blades; that is, when the fan is running they assist the action of the fan blast to raise the shutters, and when the shutters are closed they assist gravity in maintaining the shutters in closed position.

Variations and modifications in the described details may, of course, be resorted to within the purview and scope of the claims.

We claim:

1. The combination with a fan and a gang of parallel pivoted shutter blades, and a link connecting said blades for simultaneous opening movement and simultaneous closing movement, of a spring, and means actuated by said spring and coacting with said link assisting the blast when the fan is running to hold the shutter blades open and holding the shutter blades closed when the fan is idle.

2. The combination with a fan and a pivoted shutter adapted to be opened by the fan blast and to automatically close when the fan stops, of a movable link connected to said shutter, an over-the-center toggle having one arm thereof mounted on a fixed pivot and connected to said link, a spring connecting the arms of said toggle, and means for limiting the tilting movements of the other arm.

3. The combination with a fan and a pivoted shutter adapted to be opened by the fan blast and to automatically close when the fan stops, of a movable link connected to said shutter, an over-the-center toggle having one arm thereof connected at its outer end to said link and mounted between its ends on a fixed pivot, and its other arm abutting at its inner end against the inner end of said first named arm and forming therewith the knuckle of the toggle, a spring connecting said arms, and means for limiting the tilting movements of said other arm.

4. The combination with a fan and a pivoted shutter adapted to be opened by the fan blast and to automatically close when the fan stops, of a movable link connected to said shutter, an over-the-center toggle having one arm thereof connected at its outer end to said link and mounted between its ends on a fixed pivot, and its other arm formed with a concave inner end in abutting engagement with the inner end of said first named arm and forming therewith the knuckle of the toggle, a spring connected at one end thereof to one of said arms, a tension adjusting screw mounted on the other arm and connected to the other end of said spring, and means for limiting the tilting movements of said other arm.

5. The combination with a fan and a pivoted shutter adapted to be opened by the fan blast and to automatically close when the fan stops, said shutter having an upwardly and rearwardly extending arm fast therewith, of an endwise movable link connected to said arm, a cam of inverted V-shape mounted on and lengthwise of said link, a cam follower, and a spring causing said follower to hug said cam, whereby pressure of said follower on one incline of said cam assists the blast when the fan is running to hold the shutter open, and the pressure on the other incline holds the shutter closed when the fan is idle.

6. The combination with a fan, a gang of parallel pivoted shutter blades having upwardly and rearwardly extended arms connected thereto, and an endwise movable link pivoted to and connecting said arms for simultaneous opening movement and simultaneous closing movement, of a cam of inverted V-shape mounted on and lengthwise of said link, a pivoted arm carrying a cam follower on its free end lying in the path of said cam, and a spring connected to said arm and, through the latter, causing said follower to hug said cam, whereby pressure of said follower on the lower incline of said cam holds the shutter blades closed when the fan is idle and the pressure on the upper incline assists the blast when the fan is running to hold the blades open.

7. The combination with a horizontal passageway for air, means for forcing a stream of air therethrough, in one direction, and means for preventing the flow of air through said passageway in the opposite direction comprising pivoted shutter means mounted to swing about a horizontal axis from a vertical position to an inclined position, of a spring having one end connected to an anchoring means and the opposite end operatively connected to said shutter means in such a manner that the spring urges the shutter means to said vertical position when no air is being forced through said passageway and to said inclined position when air is being forced through said passageway, said spring means being also so arranged as to slightly oppose the force of said air stream in the initial part of the movement of said shutter means from said vertical position to an inclined position and thereafter assist the force of said air stream in the further movement of said shutter means to said inclined position.

8. The combination with a passageway for air, means for forcing a stream of air through said passageway in one direction, and means for preventing the flow of air through said passageway in the opposite direction, comprising pivoted shutter means mounted to swing about a fixed axis to a closed position and to an open position, of a spring having one end connected to an anchoring means and the opposite end operatively connected to said shutter means in such a manner that the spring urges the shutter means to said closed position when no air is being forced through said passageway and to said open position when air is being forced through said passageway, said spring means being also so arranged as to slightly oppose the force of said air stream in the initial part of the movement of said shutter means from said closed position to said open position and thereafter assist the force of said air stream in the further movement of said shutter means to said open position.

9. The combination with a fan, and a hinged depending shutter adapted to be opened by the fan blast, of mechanism, including a pivoted member in operative relation to said shutter and capable of moving the latter in opposite directions, and a spring connected to and exerting a constant tension on said pivoted member and acting, when the shutter has passed an intermediate point in its opening movement, to urge the shutter toward a fully opened position, and when the shutter has passed said intermediate point in its closing movement, to urge the shutter toward a fully closed position.

LEWIS C. WEAVER.
ARTHUR G. SUTCLIFFE.